(12) United States Patent
Toyamasaki

(10) Patent No.: US 9,083,834 B2
(45) Date of Patent: Jul. 14, 2015

(54) IMAGE PROCESSING APPARATUS AND AUTHENTICATION METHOD HAVING USER AUTHENTICATION FUNCTION BASED ON HUMAN BODY DETECTION

(71) Applicant: KYOCERA Document Solutions Inc., Osaka-shi, Osaka (JP)

(72) Inventor: Kenta Toyamasaki, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/092,751

(22) Filed: Nov. 27, 2013

(65) Prior Publication Data
US 2014/0153031 A1    Jun. 5, 2014

(30) Foreign Application Priority Data
Dec. 5, 2012  (JP) ................................ 2012-265939

(51) Int. Cl.
| | | |
|---|---|---|
| H04N 1/00 | (2006.01) |
| G06K 15/00 | (2006.01) |
| G07C 9/00 | (2006.01) |
| H04N 1/44 | (2006.01) |

(52) U.S. Cl.
CPC ........ H04N 1/00856 (2013.01); G06K 15/4095 (2013.01); G07C 9/00 (2013.01); H04N 1/00323 (2013.01); H04N 1/4413 (2013.01); H04N 1/4433 (2013.01)

(58) Field of Classification Search
None
See application file for complete search history.

(56) References Cited

U.S. PATENT DOCUMENTS

| | | | | |
|---|---|---|---|---|
| 6,560,711 | B1 * | 5/2003 | Given et al. ..................... 726/34 |
| 8,082,351 | B1 * | 12/2011 | Kelley et al. .................. 709/227 |
| 8,218,165 | B2 * | 7/2012 | Matsushima ................ 358/1.14 |
| 8,219,840 | B1 * | 7/2012 | Nanda et al. .................. 713/320 |
| 8,261,090 | B1 * | 9/2012 | Matsuoka ..................... 713/186 |
| 8,325,995 | B1 * | 12/2012 | Bowers et al. ............... 382/115 |
| 8,355,156 | B2 * | 1/2013 | Ogishima .................... 358/1.16 |
| 8,493,594 | B2 * | 7/2013 | Ishikawa et al. ............. 358/1.15 |
| 8,836,530 | B1 * | 9/2014 | Bowers et al. ............. 340/686.6 |
| 2005/0007619 | A1 * | 1/2005 | Minato ........................ 358/1.14 |
| 2005/0197906 | A1 * | 9/2005 | Kindig et al. .................... 705/15 |
| 2006/0056666 | A1 * | 3/2006 | Mizutani et al. .............. 382/118 |

(Continued)

FOREIGN PATENT DOCUMENTS

| | | | | |
|---|---|---|---|---|
| JP | 2005208993 A | | 8/2005 | |
| JP | 2008168588 A | * | 7/2008 | ............... B41J 29/38 |
| JP | 2009182753 A | | 8/2009 | |

*Primary Examiner* — Chuong A Ngo
*Assistant Examiner* — Edwin S Leland, III
(74) *Attorney, Agent, or Firm* — Alleman Hall McCoy Russell & Tuttle LLP

(57) ABSTRACT

The information processing apparatus includes first authentication portion, human body detecting portion, de-authentication portion, and second authentication portion. The first authentication portion shifts the state of the information processing apparatus to a login state in accordance with a predetermined first login operation. The human body detecting portion detects a human body within a predetermined range from the information processing apparatus. The de-authentication portion cancels the login state when a human body is not detected by the human body detecting portion during the login state. The second authentication portion shifts the state of the information processing apparatus to the login state in accordance with a second login operation involving less operation steps than the first login operation after the login state is canceled by the de-authentication portion.

7 Claims, 5 Drawing Sheets

(56) References Cited

U.S. PATENT DOCUMENTS

| | | | |
|---|---|---|---|
| 2006/0092455 A1* | 5/2006 | Maeda et al. | 358/1.15 |
| 2006/0268323 A1* | 11/2006 | Hashimoto | 358/1.15 |
| 2007/0079374 A1* | 4/2007 | Yasui et al. | 726/22 |
| 2007/0180253 A1* | 8/2007 | Hamaguchi | 713/176 |
| 2008/0091663 A1* | 4/2008 | Inala et al. | 707/3 |
| 2008/0170258 A1* | 7/2008 | Yamamura | 358/1.15 |
| 2008/0252922 A1* | 10/2008 | Ikegami et al. | 358/1.15 |
| 2009/0037983 A1* | 2/2009 | Chiruvolu et al. | 726/4 |
| 2009/0135188 A1* | 5/2009 | Ding et al. | 345/473 |
| 2010/0053661 A1* | 3/2010 | Ushiku | 358/1.14 |
| 2010/0067038 A1* | 3/2010 | Aoki | 358/1.14 |
| 2010/0169592 A1* | 7/2010 | Atluri et al. | 711/162 |
| 2010/0231944 A1* | 9/2010 | Takahashi | 358/1.13 |
| 2010/0253964 A1* | 10/2010 | Isshiki | 358/1.14 |
| 2010/0312946 A1* | 12/2010 | Bold et al. | 711/102 |
| 2011/0279859 A1* | 11/2011 | Hashimoto | 358/1.15 |
| 2012/0054855 A1* | 3/2012 | Shimizu | 726/19 |
| 2012/0176543 A1* | 7/2012 | Jeong | 348/563 |
| 2012/0240218 A1* | 9/2012 | Jansto | 726/16 |
| 2013/0042327 A1* | 2/2013 | Chow | 726/28 |
| 2013/0050736 A1* | 2/2013 | Akahira et al. | 358/1.14 |
| 2013/0055035 A1* | 2/2013 | Nakatsu | 714/48 |
| 2013/0057894 A1* | 3/2013 | Narushima et al. | 358/1.14 |
| 2013/0097686 A1* | 4/2013 | Towata | 726/9 |
| 2013/0128298 A1* | 5/2013 | Yamada | 358/1.13 |
| 2013/0167250 A1* | 6/2013 | Balasubramanian | 726/28 |
| 2013/0169543 A1* | 7/2013 | Xia | 345/169 |
| 2014/0153031 A1* | 6/2014 | Toyamasaki | 358/1.14 |

* cited by examiner

IMAGE PROCESSING APPARATUS AND AUTHENTICATION METHOD HAVING USER AUTHENTICATION FUNCTION BASED ON HUMAN BODY DETECTION

INCORPORATION BY REFERENCE

This application is based upon and claims the benefit of priority from the corresponding Japanese Patent Application No. 2012-265939 filed on Dec. 5, 2012, the entire contents of which are incorporated herein by reference.

BACKGROUND

The present disclosure relates to an authentication method to be employed when a user logs in to an information processing apparatus.

Image forming apparatuses such as a copying machine and a multifunction peripheral (examples of the information processing apparatus) are conventionally known which authenticate a user in accordance with a login operation in which a user ID, a password, and the like are entered, to shift to a login state for the user. In addition, a configuration is also known which automatically executes logout processing when a user is away from the image forming apparatus for longer than a predetermined period of time during the login state.

SUMMARY

An information processing apparatus according to an aspect of the present disclosure includes first authentication portion, human body detecting portion, de-authentication portion, and second authentication portion. The first authentication portion shifts the state of the information processing apparatus to a login state in accordance with a predetermined first login operation. The human body detecting portion detects a human body within a predetermined range from the information processing apparatus. The de-authentication portion cancels the login state when a human body is not detected by the human body detecting portion during the login state. The second authentication portion shifts the state of the information processing apparatus to the login state in accordance with a second login operation involving less operation steps than the first login operation after the login state is canceled by the de-authentication portion.

An authentication method according to another aspect of the present disclosure includes a first authentication step, a de-authentication step, and a second authentication step. The first authentication step shifts the state of an information processing apparatus to a login state in accordance with a predetermined first login operation. The de-authentication step cancels the login state when a human body is not detected by a human body detecting portion (6) that detects a human body within a predetermined range from the information processing apparatus during the login state. The second authentication step shifts the state of the information processing apparatus to the login state in accordance with a second login operation involving less operation steps than the first login operation after the login state is canceled by the de-authentication step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

<Schematic Configuration of Multifunction Peripheral 10>

First, a schematic configuration of the multifunction peripheral 10 according to an embodiment of the present disclosure will be described with reference to FIGS. 1 to 3.

Figure 1:
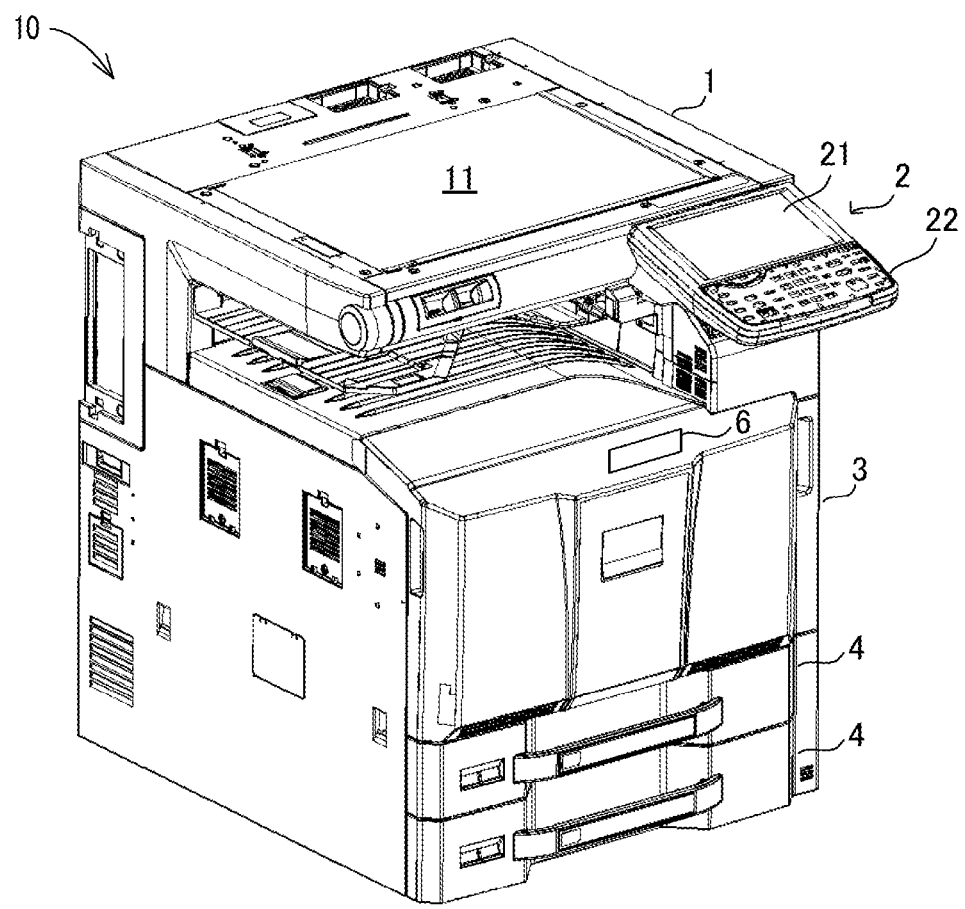
FIG. 1 is a perspective view illustrating essential portions of a multifunction peripheral according to an embodiment of the present disclosure.
Figure 2:
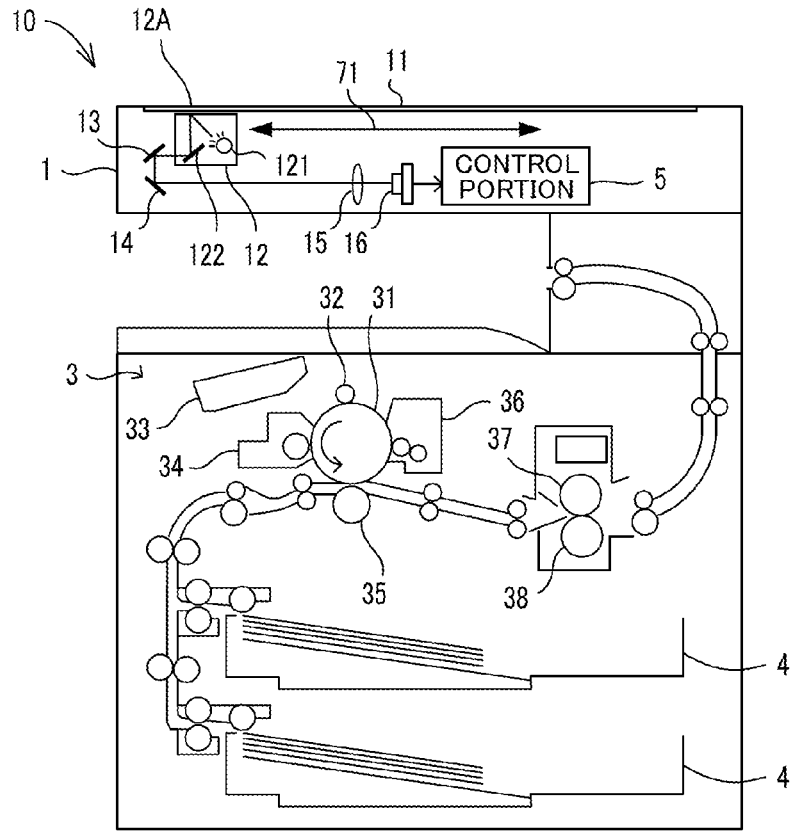
FIG. 2 is a schematic sectional view illustrating essential portions of a multifunction peripheral according to an embodiment of the present disclosure.
Figure 3:
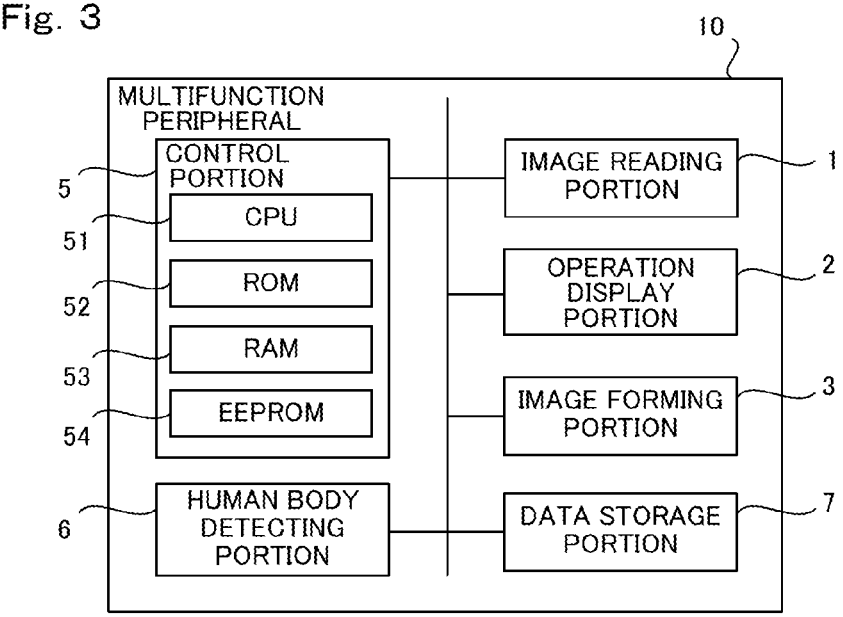
FIG. 3 is a block diagram illustrating the system configuration of a multifunction peripheral according to an embodiment of the present disclosure.

As shown in FIGS. 1 to 3, the multifunction peripheral 10 is an example of an information processing apparatus including an image reading portion 1, an operation display portion 2, an image forming portion 3, a sheet feed cassette 4, a control portion 5, a human body detecting portion 6, a data storage portion 7, and so on.

The multifunction peripheral 10 is merely an example of the information processing apparatus according to the present disclosure, and image reading apparatuses and image forming apparatuses such as scanners, facsimile machines, printers, and copying machines that execute either or both of image reading processing and image forming processing also fall under the information processing apparatus according to the present disclosure. Furthermore, personal computers, television sets, smartphones, tablets, PDAs, and other home electric appliances also fall under the information processing apparatus according to the present disclosure.

The image reading portion 1 is an image reading portion (an example of an image processing portion) that executes image reading processing to read image data from a document sheet. As shown in FIG. 2, the image reading portion 1 includes a contact glass 11, a reading unit 12, mirrors 13 and 14, an optical lens 15, and a CCD (Charge Coupled Device) 16.

The contact glass 11 is provided on the upper surface of the image reading portion 1, and is a transparent document table on which a document sheet is placed as an image reading target. An automatic document feeder (ADF) including a cover portion that covers the contact glass 11 and a conveying device that automatically conveys the document sheet is mounted to an upper part of the image reading portion 1. However, the ADF is not shown in the present embodiment.

The reading unit 12 includes an LED light source 121 and a mirror 122, and can be moved in a secondary scanning direction 71 by a movement mechanism, not shown, with a drive motor such as a stepping motor. When the reading unit 12 is moved in the secondary scanning direction by the drive motor, scanning in the secondary scanning direction is performed with light applied from the LED light source 121 onto the contact glass 11.

The LED light source 121 includes a plurality of white LEDs arranged along a primary scanning direction (a direction into the page of FIG. 2) and emits one line of white light toward the document sheet in a reading position 12A on the contact glass 11. The reading position 12A moves in the secondary scanning direction as the reading unit 12 moves in the secondary scanning direction.

The mirror 122 reflects, toward the mirror 13, light emitted from the LED light source 121 to the document sheet in the reading position 12A and reflected therefrom. The light reflected from the mirror 122 is then guided to the optical lens 15 by the mirrors 13 and 14. The optical lens 15 concentrates the light entering thereto and causes the concentrated light to enter the CCD 16.

The CCD 16 is a photoelectric conversion element that converts the light received therein into an electric signal (voltage) corresponding to the amount of the light and outputs the electric signal as image data. Specifically, the CCD 16 reads image data of the document sheet based on the light emitted from LED light source 121 and reflected from the document sheet. The image data read by the CCD 16 is input to the control portion 5.

The image forming portion 3 is an image forming portion (an example of the image processing portion) of an electrophotographic type that executes image forming processing (printing processing) based on the image data read by the image reading portion 1 or on image data input from an external information processing apparatus such as a personal computer.

As shown in FIG. 2, the image forming portion 3 includes a photosensitive drum 31, a charging device 32, an exposure device (LSU) 33, a developing device 34, a transfer roller 35, a cleaning device 36, a heating roller 37, a pressure roller 38, and so on. In the image forming portion 3, an image is formed on a paper sheet fed from the sheet feed cassette 4 by the following procedure.

First, the photosensitive drum 31 is uniformly charged at a predetermined potential by the charging device 32. Next, light based on image data is applied to the surface of the photosensitive drum 31 by the exposure device 33. Thus, an electrostatic latent image corresponding to the image data is formed on the surface of the photosensitive drum 31. Then, the electrostatic latent image on the photosensitive drum 31 is developed (visualized) as a toner image by the developing device 34. A toner (developer) is supplied to the developing device 34 from a toner container, not shown, that is attachable to and detachable from the image forming portion 3. Subsequently, the toner image formed on the photosensitive drum 31 is transferred onto a paper sheet by the transfer roller 35. Thereafter, the toner image transferred on the paper sheet is melted and fixed by heating by the heating roller 37 when the paper sheet passes between the heating roller 37 and the pressure roller 38. The surface of the photosensitive drum 31 is cleaned by the cleaning device 36.

The sheet feed cassette 4 contains a plurality of paper sheets. The sheet feed cassette 4 includes a paper sheet level sensor that detects the level of paper sheets contained in the cassette, and the paper sheet level sensor inputs the level of paper sheets detected to the control portion 5. The control portion 5 detects errors such as an out of paper error in the sheet feed cassette 4 according to the detection result provided by the paper sheet level sensor.

Here, various conventionally-known detection techniques may be employed as the technique of the paper sheet level detection with the paper sheet level sensor. For example, the paper sheet level sensor may include an optical sensor that detects presence or absence of paper sheets in the sheet feed cassette 4. The sheet feed cassette 4 is provided with a lift plate that lifts up the paper sheets in the sheet feed cassette 4 till the uppermost paper sheet contacts a pickup roller. The paper sheet level sensor may therefore detect the paper sheet level according to the position of the elevating lift plate. Alternatively or additionally, the control portion 5 may detect the paper sheet level (the number of paper sheets) based on the time until the uppermost paper sheet contacts the pickup roller with the elevation of the lift plate when the sheet feed cassette 4 is attached to the multifunction peripheral 10, and on the print counts thereafter.

The operation display portion 2 includes a touch panel 21 and operation buttons 22 as shown in FIG. 1. The touch panel 21 has a display portion such as a liquid crystal panel that displays various pieces of information in accordance with control instructions from the control portion 5 and a position detecting portion that inputs operation signals to the control portion 5 in response to operation entry by a user. That is, the touch panel 21 serves as a display portion and as an operation portion in the multifunction peripheral 10. The operation buttons 22 include various operation buttons such as a numeric keypad and a start key that allow the user to input various operations to the control portion 5. Pressed by the user, each operation button 22 inputs an operation signal corresponding to the operation button to the control portion 5.

The human body detecting portion 6 is provided in a front panel of the multifunction peripheral 10 and detects a human body within a predetermined detection range from the multifunction peripheral 10. For example, when a user operates the operation display portion 2, the human body detecting portion 6 detects a human body within the detection range where the presence of the user is detectable. The human body detecting portion 6 may be a pyroelectric infrared sensor that detects the presence of a human body by detecting a thermal change based on incident infrared rays, for example. The human body detecting portion 6 may be various conventionally-known sensors such as an ultrasonic displacement sensor that detects contiguity of a human body using ultrasound, for example. The result of the detection by the human body detecting portion 6 is input to the control portion 5. Accordingly, the control portion 5 can determine whether or not a user is present near the multifunction peripheral 10. For example, the control portion 5 starts displaying the touch panel 21 of the operation display portion 2 when a human body is detected by the human body detecting portion 6 and stops displaying the touch panel 21 when a human body is no longer detected by the human body detecting portion 6. The power consumption by the display of the touch panel 21 is thereby reduced.

The data storage portion 7 is a nonvolatile storage portion such as a hard disk or an SSD that stores match information regarding IDs and passwords of users previously registered as users authorized to use the multifunction peripheral 10. The match information is referred to in user authentication processing in login management processing and re-login processing to be executed by the control portion 5 as described later.

As shown in FIG. 3, the control portion 5 is a computer that has control devices such as a CPU 51, a ROM 52, a RAM 53, and an EEPROM 54, and controls the operation of the multifunction peripheral 10. Specifically, the control portion 5 causes the multifunction peripheral 10 to execute copy processing, scan processing, print processing, facsimile processing, and the like by causing the CPU 51 to execute various control programs prestored in the ROM 52. The RAM 53 is a volatile storage portion, and the EEPROM 54 is a nonvolatile storage portion. They are used as a temporary memory of various sorts of processing to be executed by the CPU 51 or an image memory. The control portion 5 may be formed of an electronic circuit such as integrated circuits (ASIC and DSP). The control portion 5 may be a control portion provided separately from a main control portion that provides overall control of the multifunction peripheral 10.

In the ROM 52 of the control portion 5, an authentication program is prestored which causes the CPU 51 of the control portion 5 to execute the login management processing (see FIG. 4) and the re-login processing (see FIG. 5) described later. The control portion 5 controls user's login state to the multifunction peripheral 10 by executing the login management processing and the re-login processing.

The authentication program is stored in a computer-readable recording medium such as a CD, a DVD, and a flash memory, and may be installed from the recording medium into a storage portion such as the EEPROM 54 or the data storage portion 7 of the control portion 5. The present disclosure may be understood as an authentication method including execution of the procedure of the login management processing and the re-login processing in the multifunction peripheral 10. The present disclosure may also be understood as disclosure of an authentication program for causing the control portion 5 to execute the procedure of the login management processing and the re-login processing or disclosure of a computer-readable recording medium in which the authentication program is stored.

In case of an error such as an out of paper error or an out of toner error in an image forming apparatus such as the multifunction peripheral 10, the user may temporarily leave the image forming apparatus in order to deal with the error. In this case, the user is highly likely to continue using the image forming apparatus after eliminating the error. In the conventional art, however, such a temporal absence may cause the automatic cancellation of the login state, and then the user needs to perform again a login operation involving entry of his/her ID and password after eliminating the error in the image forming apparatus. If the login state is maintained during a predetermined period of time after the user leaves the image forming apparatus, on the other hand, the image forming apparatus may be used by another user while the login state is maintained. In contrast, the multifunction peripheral 10 can reduce re-login steps to be performed by the user, while preventing the use by others during the user's login state.

<Login Management Processing>

Figure 4:
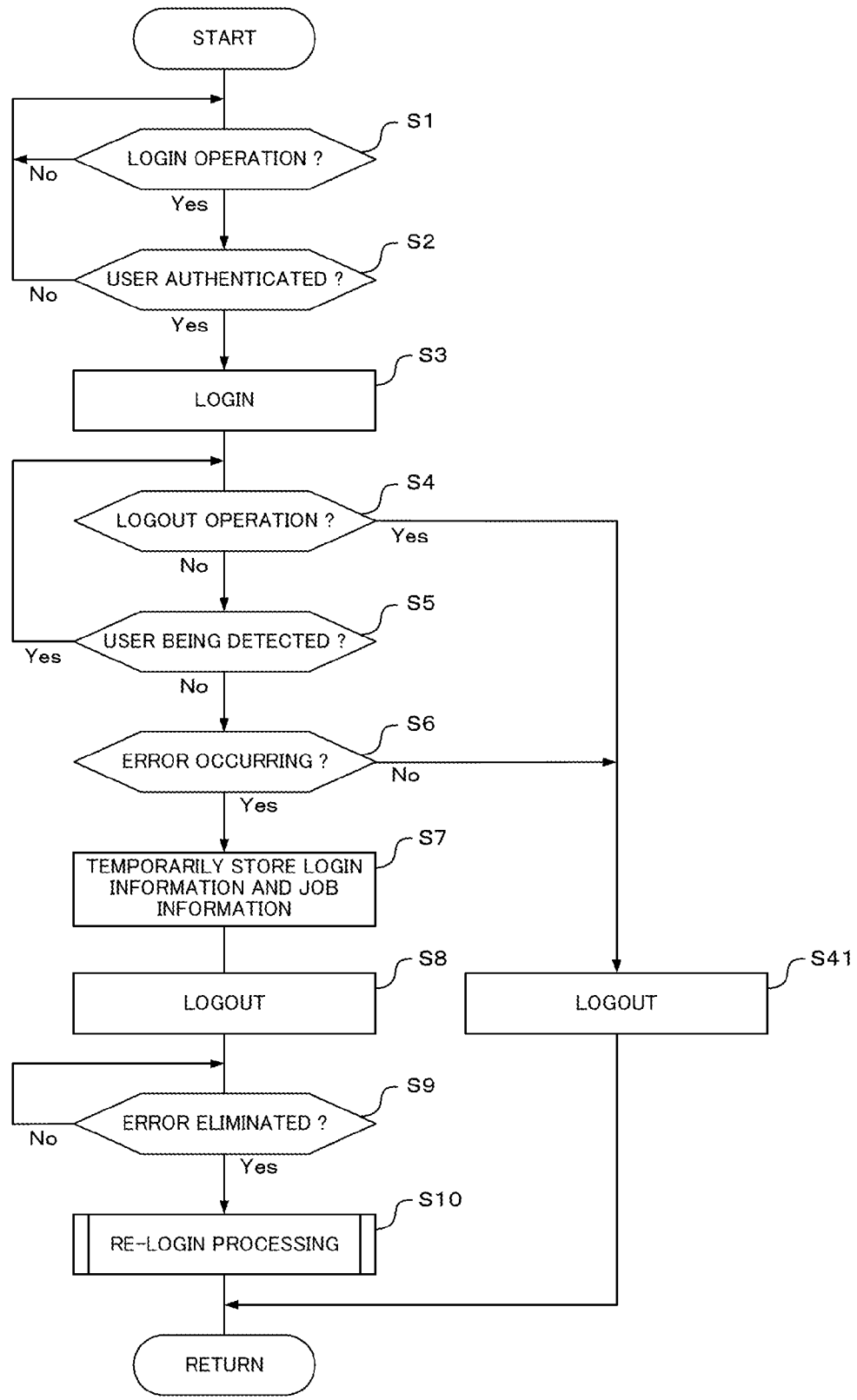
FIG. 4 is a flowchart to be used for description of an example of procedure of login management processing to be executed in a multifunction peripheral according to an embodiment of the present disclosure.

Hereinafter, an example of the procedure of the login management processing to be executed by the control portion 5 will be described with reference to FIG. 4. The procedure (steps) of the login management processing to be executed by the control portion 5 will be referred to as steps S1, S2, and so on.

[Step S1]

First, in step S1, the control portion 5 determines whether a predetermined login operation has been performed on the operation display portion 2. The login operation includes a plurality of steps of operation procedure to be performed on the operation display portion 2.

Specifically, the control portion 5 causes the touch panel 21 of the operation display portion 2 to display a normal login screen P1 for a user to perform a normal login operation when a human body is detected within the detection range of the human body detecting portion 6.

Figure 6A:
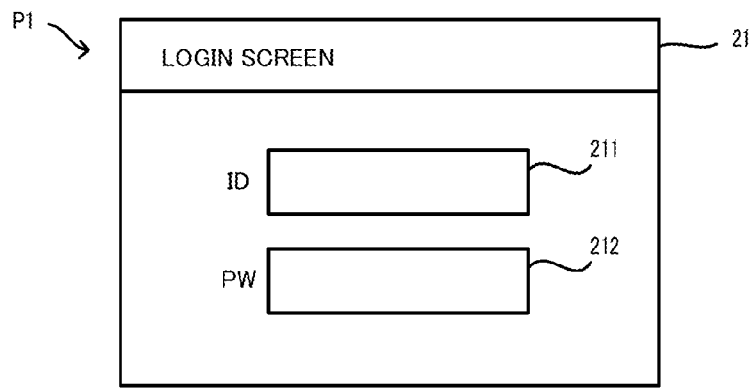
FIGS. 6A, 6B, and 6C are diagrams illustrating examples of operation screens to be used in a multifunction peripheral according to an embodiment of the present disclosure.

Here, FIG. 6A is a diagram illustrating an example of the normal login screen P1. The normal login screen P1 shown in FIG. 6A displays an ID entry portion 211 for entry of a user ID and a PW entry portion 212 for entry of a user password. The user enters an ID into the ID entry portion 211 and a password into the PW entry portion 212. That is, the login operation to be performed by the user (corresponding to the first login operation) includes a plurality of operation steps of the ID entry portion 211 and the PW entry portion 212. Meanwhile, once the ID entry portion 211 or the PW entry portion 212 is operated, the control portion 5 causes the touch panel 21 to display a software keyboard to receive the entry of the user ID and password with the use of the software keyboard.

Here, the control portion 5 shifts the processing to step S2 when it determines that the login operation has been performed (Yes in S1). On the other hand, the control portion 5 keeps the processing in step S1 till the login operation is performed (No in S1).

In the present embodiment, the case where the control portion 5 carries out the login operation using the touch panel 21 of the operation display portion 2 is described as an example. However, the login operation is not limited to the case. Examples of the first login operation include the case where the multifunction peripheral 10 includes a card reader or a fingerprint matcher, and a user lets the card reader or the fingerprint matcher read his/her ID card or his/her fingerprint, and subsequently enters a predetermined password.

[Step S2]

In step S2, the control portion 5 checks the ID and the password input to the ID entry portion 211 and the PW entry portion 212 against the ID and the password in the match information stored in the data storage portion 7 to determine user authentication.

Here, the control portion 5 shifts the processing to step S3 when it determines that the check result is a match, and thus the user has been authenticated (Yes in S2). On the other hand, the control portion 5 causes the touch panel 21 of the operation display portion 2 to display a message telling that the user has not been authenticated and shifts the processing to step S1 when the check result is not a match (No in S2).

[Step S3]

In step S3, the control portion 5 shifts the state of the multifunction peripheral 10 to a login state for the user authenticated in step S2. Then, various operations are performed while the multifunction peripheral 10 is in the login state for the user. For example, reference to the user's data folders stored in the multifunction peripheral 10 is allowed, and the number of sheets printed in the multifunction peripheral 10 is counted up as the user's print counts.

The control portion 5 corresponds to a first authentication portion when it executes the processing to shift the state of the multifunction peripheral 10 to a login state in accordance with the login operation performed on the touch panel 21 in the normal login screen P1 as described above (first authentication process). Hereinafter, for convenience of description, the user authenticated in step S2 will be referred to as the particular user, and any other user than the particular user will be referred to as third-party user.

[Step S4]

In step S4, the control portion 5 determines whether or not a predetermined logout operation has been performed on the operation display portion 2. For example, the logout operation is operation of a logout key (not shown) displayed on the touch panel 21 of the operation display portion 2.

Here, the control portion 5 shifts the processing to step S41 when it determines that the logout operation has been performed (Yes in S4). On the other hand, the control portion 5 shifts the processing to step S5 when the logout operation has not been performed (No in S4).

[Step S41]

In step S41, the control portion 5 executes the logout processing to cancel the login state for the particular user and returns the processing to step S1.

[Step S5]

On the other hand, in step S5, the control portion 5 determines whether or not a human body is being detected by the human body detecting portion 6. For example, the control portion 5 determines that a human body is no longer being detected when no human body movement is detected by the human body detecting portion 6 for longer than a predetermined period of time.

Here, the control portion 5 shifts the processing to step S4 when it determines that a human body is being detected by the human body detecting portion 6 (Yes in S5). On the other hand, the control portion 5 shifts the processing to step S6 when it determines that a human body is no longer being detected by the human body detecting portion 6 (No in S5). Accordingly, the multifunction peripheral 10 is kept in the login state as long as a human body is being detected by the human body detecting portion 6.

[Step S6]

In step S6, the control portion 5 determines whether or not any error of predetermined error items is occurring on the multifunction peripheral 10. That is, in step S6, the control portion 5 determines whether a human body is no longer being detected by the human body detecting portion 6 during the occurrence of error on the multifunction peripheral 10. Examples of the predetermined error items include paper jam, out of paper, out of toner (out of ink), time to replace photosensitive drum, toner waste container full, and dirt on contact glass. Meanwhile, the control portion 5 separately executes processing for monitoring occurrence of an error in the multifunction peripheral 10. This processing is the same as conventional one, and therefore description thereof will be omitted here.

Here, the control portion 5 shifts the processing to step S7 when it determines that an error of the predetermined error items is occurring (Yes in S6). On the other hand, the control portion 5 shifts the processing to step S41 so that the login state will be automatically canceled when no error of the predetermined error items is occurring (No in S6).

[Step S7]

In step S7, the control portion 5 stores login information concerning the particular user and job information concerning the content of a job set up during the login state, into a storage portion such as the EEPROM 54 or the data storage portion 7. Here, the control portion 5 corresponds to a job storage control portion when it carries out step 7. Thereby, in the multifunction peripheral 10, the job setup information will be maintained in a storage portion such as the EEPROM 54 or the data storage portion 7 when the login state for the particular user is canceled in step S8 described later.

The login information includes name, ID, password, and login date and time, for example, of the particular user with the login state. The job content includes print counts, print size, enlargement and reduction, 2 in 1 printing, density, address of data transmission, and job progress up to occurrence of an error (remaining job), for example. In step S7, error information concerning the error determined to be occurring in step S6 is also stored in a storage portion such as the EEPROM 54 or the data storage portion 7 together with the login information and the job setup information.

[Step S8]

In step S8, the control portion 5 executes the logout processing to cancel the login state for the particular user. Thus, in the multifunction peripheral 10, the login state is automatically canceled in step S41 or in step S8 when a human body is no longer being detected by the human body detecting portion 6 while the error is occurring during the login state (No in S5 and Yes in S6). Here, the control portion 5 corresponds to a de-authentication portion when it executes processing to automatically cancel the login state in accordance with a detection result provided by the human body detecting portion 6 (de-authentication process).

[Step S9]

In step S9, the control portion 5 puts the processing on hold till the error determined to be occurring in step S6 is eliminated (No in S9). The control portion 5 shifts the processing to step S10 once the error is eliminated (Yes in S9). In case of an out of paper error in the multifunction peripheral 10, for example, the error is eliminated by supplying paper sheets to the sheet feed cassette 4 of the multifunction peripheral 10.

[Step S10]

Subsequently, in step S10, the control portion 5 executes the re-login processing that enables the multifunction peripheral 10 to return to the login state for the particular user with simplified operation by the particular user. After completion of the re-login processing, the control portion 5 returns the processing to step S1.

<Re-login processing>

Figure 5:
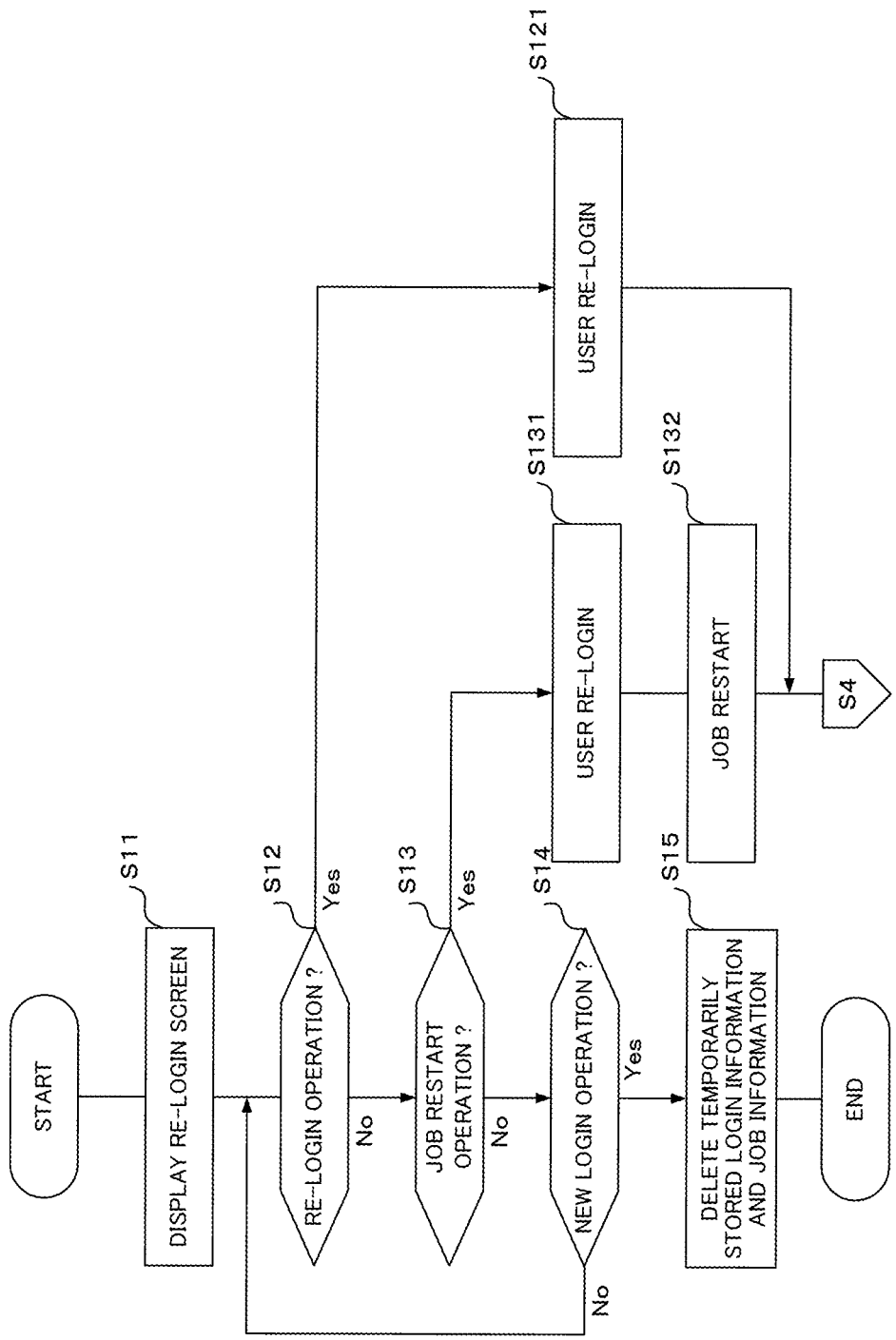
FIG. 5 is a flowchart to be used for description of an example of procedure of re-login processing to be executed in a multifunction peripheral according to an embodiment of the present disclosure.

Hereinafter, an example of the procedure of the re-login processing to be executed by the control portion 5 will be described with reference to FIG. 5. The procedure (steps) of the re-login processing to be executed by the control portion 5 will be referred to as steps S11, S12, and so on.

[Step S11]

First, in step S11, the control portion 5 causes the touch panel 21 to display a re-login screen P2 that allows the particular user to perform re-login with simplified operation. The control portion 5 may cause the touch panel 21 to display the re-login screen P2 only when a human body is being detected by the human body detecting portion 6 and not to display the re-login screen P2 when a human body is not being detected.

Figure 6B:
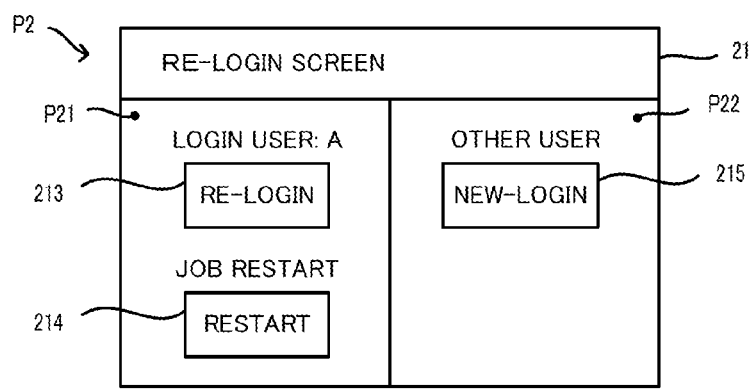

Here, FIG. 6B is a diagram illustrating an example of the re-login screen P2. As shown in FIG. 6B, the re-login screen P2 displays an operation screen P21 for the particular user to perform re-login and an operation screen P22 for the third-party user to perform normal login.

The operation screen P21 displays a re-login key 213 (an example of a first operation key) and a job restart key 214 (an example of a second operation key) as well as identification information "A" of the particular user. The re-login key 213 is an operation key to be operated when the particular user performs re-login. The job restart key 214 is an operation key to be operated when the particular user restarts the job set up in the previous login state and interrupted due to the error. In another embodiment, the operation screen P21 may display only one of the re-login key 213 and the job restart key 214.

The operation screen P22 displays a new login key 215 (an example of a third operation key) for displaying the normal login screen P1 (see FIG. 6A), which is displayed in step S1.

[Steps S12 to S14]

Next, in steps S12 to S14, the control portion 5 puts the processing on hold till one of the re-login key 213, the job restart key 214, and the new login key 215 displayed on the touch panel 21 is selected (No in S12 to S14).

The control portion 5 shifts the processing to step S121 when it determines that the re-login key 213 has been operated (Yes in S12). The control portion 5 shifts the processing to step S131 when it determines that the job restart key 214 has been operated (Yes in S13). Alternatively, the control portion 5 shifts the processing to step S15 when it determines that the new login key 215 has been operated (Yes in S14). In another embodiment, the control portion 5 may shift the processing to step S15 when the user has not performed any operation on the re-login screen P2 for a predetermined period of time after the control portion 5 determines that the error has been eliminated in step S9.

[Step S121]

When the re-login key 213 has been operated, the control portion 5 shifts, in following step S121, the state of the multifunction peripheral 10 to the login state for the particular user, and subsequently shifts the processing to step S4 for the login management processing (see FIG. 4). Specifically, the control portion 5 determines the particular user based on the login information stored in the EEPROM 54 in step S7 in the login management processing (see FIG. 4) and shifts the state of the multifunction peripheral 10 to the login state for the particular user.

As described above, the control portion 5 shifts the state of the multifunction peripheral 10 to the login state for the particular user according only to the operation of the re-login key 213 without requiring the normal login operation on the normal login screen P1 (see FIG. 6A). Thus, the user can log in to the multifunction peripheral 10 again with simplified operation procedure involving less operation steps than the operation procedure on the normal login screen P1. Here, the operation of the re-login key 213 is an example of the second login operation, and the control portion 5 corresponds to a second authentication portion when it executes the processing to shift the state of the multifunction peripheral 10 to the login state in accordance with the second login operation (a second authentication step).

Figure 6C:
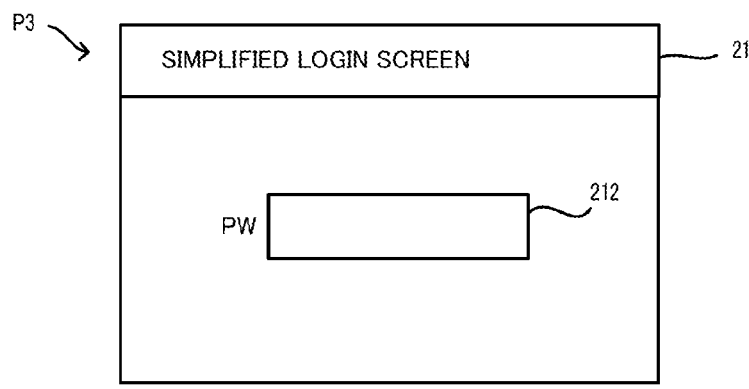

The control portion 5A may cause the touch panel 21 to display a simplified login screen P3 as shown in FIG. 6C when the re-login key 213 has been operated. The simplified login screen P3 displays only the PW entry portion 212 without showing the ID entry portion 211, which is displayed on the normal login screen P1 (see FIG. 6A). The control portion 5 executes processing to authenticate the particular user as in step S3 once a password is input to the PW entry portion 212 by operation of the touch panel 21 by the user. Specifically, the control portion 5 retrieves the ID of the particular user out of the login information stored in the EEPROM 54 and authenticates the particular user in accordance with the ID and the password. Such a configuration also allows the particular user to perform less operation steps for the re-login operation than the steps of the normal login operation since the particular user can omit the step of entering the ID. It should be noted that the above-described re-login technique is only an example and the re-login may be performed in accordance with any technique involving other operation procedure as long as the technique allows the user to perform less operation steps than the steps of the normal login operation. For example, the number of characters of the ID or the password to be entered may be shortened to the first or last few characters. In the configuration employing the login technique including the card reading operation with a card reader and the password entry, the re-login may be caused by only one of the card reading operation and the password entry.

[Steps S131 to S132]

When the job restart key 214 is operated, the control portion 5 shifts, in following step S131, the state of the multifunction peripheral 10 to the login state for the particular user as in step S121. Here, the operation of the job restart key 214 is an example of a job restart operation.

Subsequently, in step S132, when there is a job interrupted due to the occurrence of the error during the login state for the particular user, the control portion 5 restarts the job. Then, the control portion 5 shifts the processing to step S4.

Specifically, the control portion 5 determines the job content based on the job setup information stored in the EEPROM 54 or in the data storage portion 7 in step S7 in the login management processing (see FIG. 4) and causes the multifunction peripheral 10 to restart the job. The control portion 5 skips step S132 and shifts the processing to step S3 when no job is being interrupted. In another embodiment, the control portion 5 may not cause the re-login screen to display the job restart key 214 when no job is being interrupted.

As described above, the control portion 5 executes the re-login and the restart of the interrupted job according only to the operation of the job restart key 214 without requiring the normal login operation on the normal login screen P1 (see FIG. 6A) and job resetting. Thus, the particular user can log in to the multifunction peripheral 10 again with simplified operation procedure involving less operation steps than the operation procedure on the normal login screen P1 and make the multifunction peripheral 10 restart the job. Accordingly, the particular user is free from the burden of resetting the job. Here, the operation of the job restart key 214 is also an example of the second login operation, and the control portion 5 corresponds to a job restart portion when it executes the processing to restart the job.

[Step S15]

On the other hand, when the new login key 215 has been operated, the control portion 5 deletes, in following step S15, the login information and the job setup information stored in the EEPROM 54 or in the data storage portion 7. Subsequently, the control portion 5 terminates the re-login processing and shifts the processing to step S1 in the login management processing (see FIG. 4), thereby causing the touch panel 21 to display the normal login screen P1.

Consequently, the third-party user will execute the normal login operation to the multifunction peripheral 10 on the normal login screen P1 as the third-party user himself/herself rather than as the particular user by operating the new login key 215. In another embodiment, the control portion 5 may not delete the job setup information in step S15, and the interrupted job can be restarted based on the job setup information at the next login by the particular user.

As described above, in the multifunction peripheral 10, when the particular user temporarily leaves the multifunction peripheral 10 due to occurrence of an error during the login state for the particular user and then the error is eliminated, the particular user can log in again with simplified operation.

The third-party user, who is not the particular user, will intentionally select between the login as the particular user who is not himself/herself and the login as the third-party user himself/herself on the re-login screen P2. In order for the third-party user to use the multifunction peripheral 10 in the login state for the particular user, therefore, the third-party user needs to intentionally log in as the particular user who is not himself/herself. This prevents unauthorized use, that is, use of the multifunction peripheral 10 by the third-party user in a login state for another user.

In the present embodiment, the case where the user temporarily leaves the multifunction peripheral 10 due to occurrence of an error in the multifunction peripheral 10 has been described as an example. However, the present disclosure is not limited to such a case. Specifically, in another embodiment, the login state may be automatically canceled when a human body is no longer being detected by the human body detecting portion 6, and the re-login processing in step S10 may be executed at the next detection of a human body by the human body detecting portion 6. Thereby, when the particular user having logged in to the multifunction peripheral 10 temporarily leaves the multifunction peripheral 10, and then needs to use the multifunction peripheral 10 again, the particular user can log in again with simplified operation, and unauthorized use by the third-party user can be prevented.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus comprising:
    a first authentication portion, executed by a processor, that shifts a state of the information processing apparatus to a login state in accordance with a first login operation in which login information including an ID and a password of a user is input;
    a human body detecting portion that detects a human body within a predetermined range from the information processing apparatus;
    a de-authentication portion, executed by the processor, that when a human body is not being detected by the human body detecting portion during the login state and an error has occurred in the information processing apparatus, stores the login information and cancels the login state, and that when a human body is not being detected by the human body detecting portion during the login state and no error has occurred in the information processing apparatus, cancels the login state without storing the login information; and
    a second authentication portion that, when a second login operation, the second login operation involving fewer operation steps than the first login operation and involving only an input of the password, is performed during a period after the login state is canceled by the de-authentication portion while an error has occurred in the information processing apparatus and subsequently been eliminated, and before a next first login operation is started, authenticates the user in accordance with the password input in the second login operation and the login information stored by the de-authentication portion, and shifts the state of the information processing apparatus to the login state.

2. The information processing apparatus according to claim 1, further comprising:
    a job storage control portion that stores in a storage portion job setup information concerning a job set up during the login state when the login state is canceled by the de-authentication portion; and
    a job restart portion that restarts the job based on the job setup information stored in the storage portion in accordance with a job restart operation involving less operation steps than the first login operation after the login state is canceled by the de-authentication portion.

3. The information processing apparatus according to claim 1, comprising a display control portion that causes a display portion to display a re-login screen including either or both of a first operation key and a second operation key when the login state is canceled by the de-authentication portion during occurrence of an error in the information processing apparatus and the error is eliminated afterward, wherein
    the second login operation includes operation of the first operation key, and
    the job restart operation includes operation of the second operation key.

4. The information processing apparatus according to claim 3, wherein the display control portion causes the display portion to display the re-login screen when a human body is being detected by the human body detecting portion and not to display the re-login screen when a human body is not being detected by the human body detecting portion.

5. The information processing apparatus according to claim 3, wherein the display control portion causes the re-login screen to display a third operation key, and
    the first authentication portion causes the display portion to display a normal login screen that allows the first login operation in accordance with operation of the third operation key.

6. The information processing apparatus according to claim 1, comprising an image processing portion that executes either or both of image forming processing and image reading processing.

7. An authentication method comprising:
    a first authentication step of shifting a state of an information processing apparatus, with a processor of the information processing apparatus, to a login state in accordance with a first login operation in which login information including an ID and a password of a user is input;
    a human body detecting step of detecting a human body within a predetermined range from the information processing apparatus;
    a de-authentication step of, when a human body is not being detected in the human body detecting step during the login state and an error has occurred in the information processing apparatus, storing the login information in memory of the information processing apparatus and canceling, with the processor, the login state, and when a human body is not being detected in the human body detecting step during the login state and no error has occurred in the information processing apparatus, canceling the login state without storing the login information; and
    a second authentication step of, when a second login operation, the second login operation involving fewer operation steps than the first login operation and involving only an input of the password, is performed during a period after the login state is canceled in the de-authentication step while an error has occurred in the information processing apparatus and subsequently been eliminated, and before a next first login operation is started, authenticating, with the processor, the user in accordance with the password input in the second login operation and the login information stored in the memory in the de-authentication step, and shifting the state of the information processing apparatus to the login state.

* * * * *